United States Patent
Richardson et al.

(10) Patent No.: US 6,575,265 B2
(45) Date of Patent: Jun. 10, 2003

(54) LINEAR DIFFERENTIAL ASSISTED CONTROLLED STEERING

(75) Inventors: Mark A. Richardson, Midland, MI (US); Brian Jerome Magnus, Saginaw, MI (US); Chad David Bauer, Freeland, MI (US); Jeremy L. Cradit, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 15 days.

(21) Appl. No.: 09/812,240

(22) Filed: Mar. 19, 2001

(65) Prior Publication Data

US 2002/0029922 A1 Mar. 14, 2002

Related U.S. Application Data

(60) Provisional application No. 60/193,113, filed on Mar. 30, 2000.

(51) Int. Cl.$^7$ .................................................. B62D 5/04
(52) U.S. Cl. ......................... 180/444; 180/446; 475/339
(58) Field of Search ................................ 180/444, 446; 475/330, 338, 339; 74/388 PS

(56) References Cited

U.S. PATENT DOCUMENTS

| | | | | |
|---|---|---|---|---|
| 4,658,927 A | * | 4/1987 | Kanazawa | 180/446 |
| 4,739,855 A | * | 4/1988 | Miyoshi et al. | 180/422 |
| 4,932,492 A | * | 6/1990 | Sauvageot et al. | 180/446 |
| 4,956,590 A | * | 9/1990 | Phillips | 180/446 |
| 5,050,697 A | * | 9/1991 | Umemura | 180/442 |
| 5,174,407 A | * | 12/1992 | Shimizu et al. | 180/444 |
| 5,267,625 A | * | 12/1993 | Shimizu | 180/443 |
| 5,762,162 A | * | 6/1998 | Bodtker | 180/444 |
| 6,199,654 B1 | * | 3/2001 | Kojo et al. | 180/443 |
| 6,302,441 B1 | * | 10/2001 | Kawamuro et al. | 180/446 |

OTHER PUBLICATIONS

Dr. Eckrich M. et al., "New Steering—BMW on the road to success with ASCET–SD, ES1000 and INCA", Real Times pp. 20–21, Jan., 2001.

* cited by examiner

*Primary Examiner*—Daniel G. DePumpo
(74) *Attorney, Agent, or Firm*—Edmund P. Anderson

(57) ABSTRACT

A gear assembly comprising a linear differential disposed at the gear assembly wherein the linear differential has a predetermined ratio from an input shaft to an output shaft, the ratio being adjustable by axially rotating the linear differential. A method of adjusting steering output as compared to steering input, which comprises powering a motor in operable communication with a worm and worm gear mechanism and rotating the worm and the worm gear mechanism fixed to a differential carrier. The method also comprises rotating the differential carrier, which comprises an input sun gear meshed with input differential planet gear, an input differential planet gear meshed with an output differential planet gear, and an output sun gear meshed with the output differential planet gear. The method further comprises rotating the output sun gear fixed to a differential output shaft.

8 Claims, 5 Drawing Sheets

LINEAR DIFFERENTIAL ASSISTED CONTROLLED STEERING

CROSS REFERENCE TO RELATED APPLICATION

This application is based upon, and claims the benefit of, U.S. Provisional Patent Application No. 60/193,113 filed Mar. 30, 2000, the disclosure of which is incorporated by reference herein in its entirety.

BACKGROUND

Steering systems function to assist a vehicle operator in directing the road wheels in order to steer the vehicle. In conventional steering systems, the operator controls the direction of the vehicle with the aid of a hand wheel mechanically connected to the road wheels.

SUMMARY

The gear assembly is comprised of a linear differential disposed at the gear assembly wherein the linear differential has a predetermined ratio from an input shaft to an output shaft, the ratio being adjustable by axially rotating the linear differential. The method for adjusting steering output as compared to steering input is comprised of powering a motor in operable communication with a worm and worm gear mechanism and rotating the worm and the worm gear mechanism, which is fixed to a differential carrier. The method also comprises rotating the differential carrier, which comprises an input sun gear meshed with input differential planet gears, input differential planet gears meshed with output differential planet gears, and an output sun gear meshed with the output differential planet gears. The method further comprises rotating the output sun gear fixed to a differential output shaft.

DESCRIPTION OF THE DRAWINGS

The present disclosure will now be described, by way of example, with reference to the accompanying drawings, wherein like elements are numbered alike in the several Figures.

DETAILED DESCRIPTION

Introduction

Figure 1:
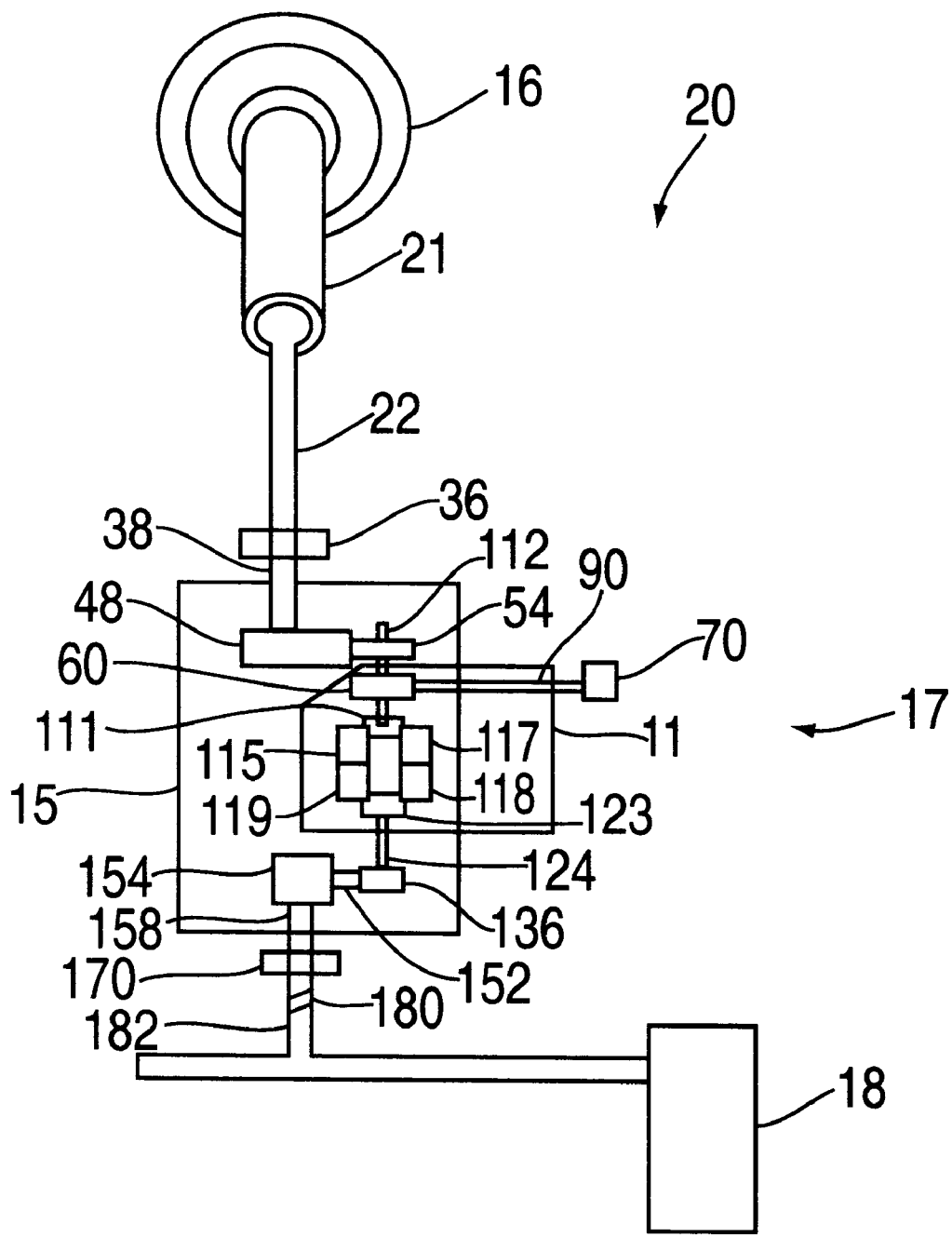
FIG. 1 is a schematic view of a steering system of a vehicle.

Referring to FIG. 1, a steering system 20 of a vehicle is shown generally. The steering system comprises a hand wheel 16 in operable communication with road wheels 18 (only one illustrated) of the vehicle through a steering column 15. Steering column 15 receives input from either hand wheel 16, which is in operable communication with a shaft 22, or a motor 70, which is in operable communication with a worm shaft 90 and a worm gear 60. After receiving the input, a steering ratio adjuster 17 selects the appropriate ratio to adjust road wheels 18. A steering ratio adjuster 17 may be a linear differential gear system 11 and may be incorporated into steering column 15.

For example, the driver turns hand wheel 16, which turns shaft 22 at a 1:1 ratio to an output shaft 158, ultimately steering the road wheels 18 of the vehicle. Alternatively, motor 70 activates pursuant to a command from a controller (not shown) receiving and processing sensory information about an angle of road wheels 18, which occurs when road wheels 18 assume a position that is not desirable. When motor 70 activates, it rotates a linear differential gear system 11, which is part of steering column 15. Linear differential gear system 11 rotates an output shaft 158 at a different speed from shaft 22. This rotation repositions road wheels 18 to achieve a more desirable handling and ride condition. A more detailed explanation of the operation is set forth herein under the "Operation" section.

Structural Connection

Figure 2:
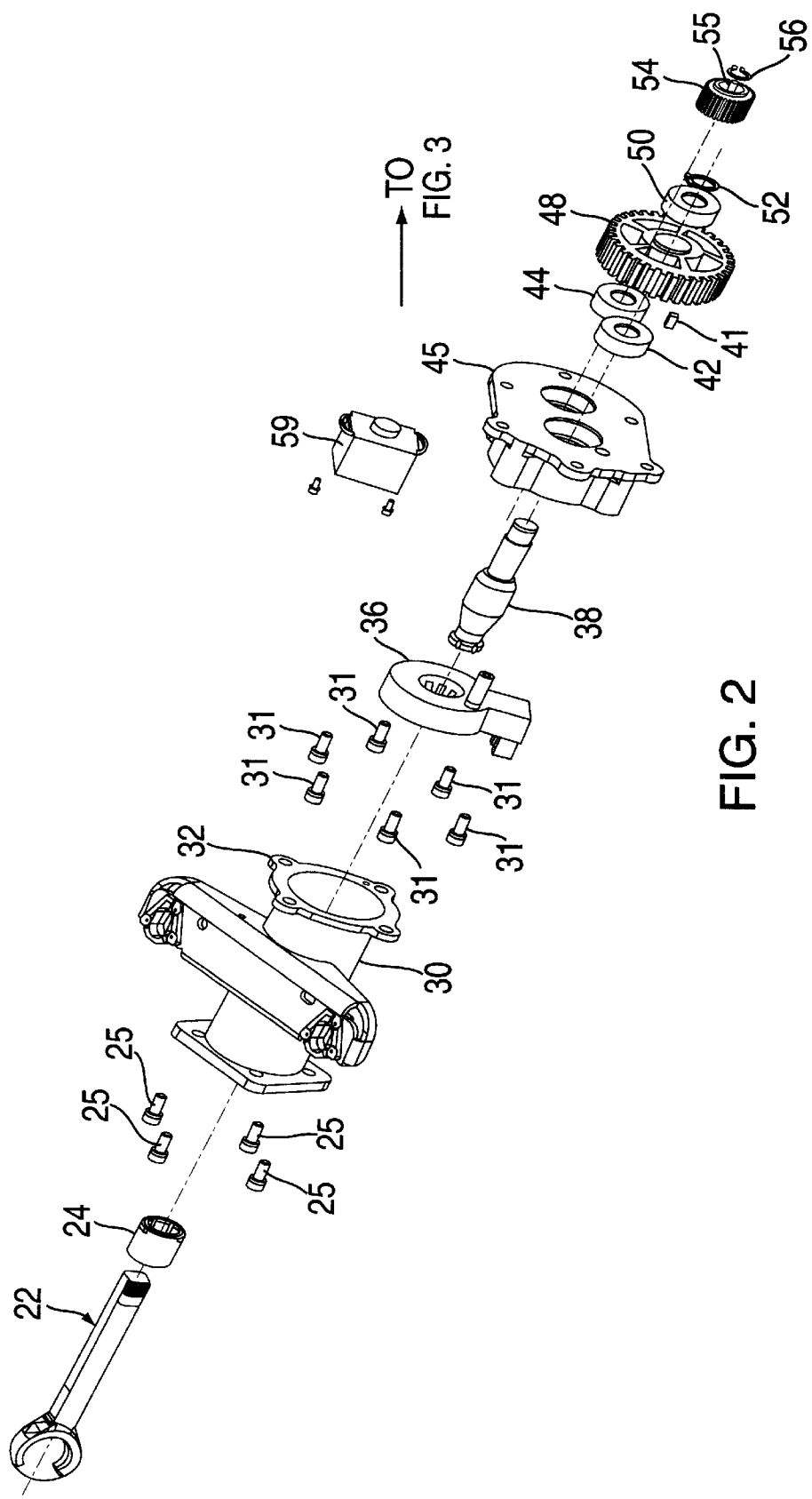
FIGS. 2–5 are an exploded perspective view of a steering system of a vehicle.
Figure 3:
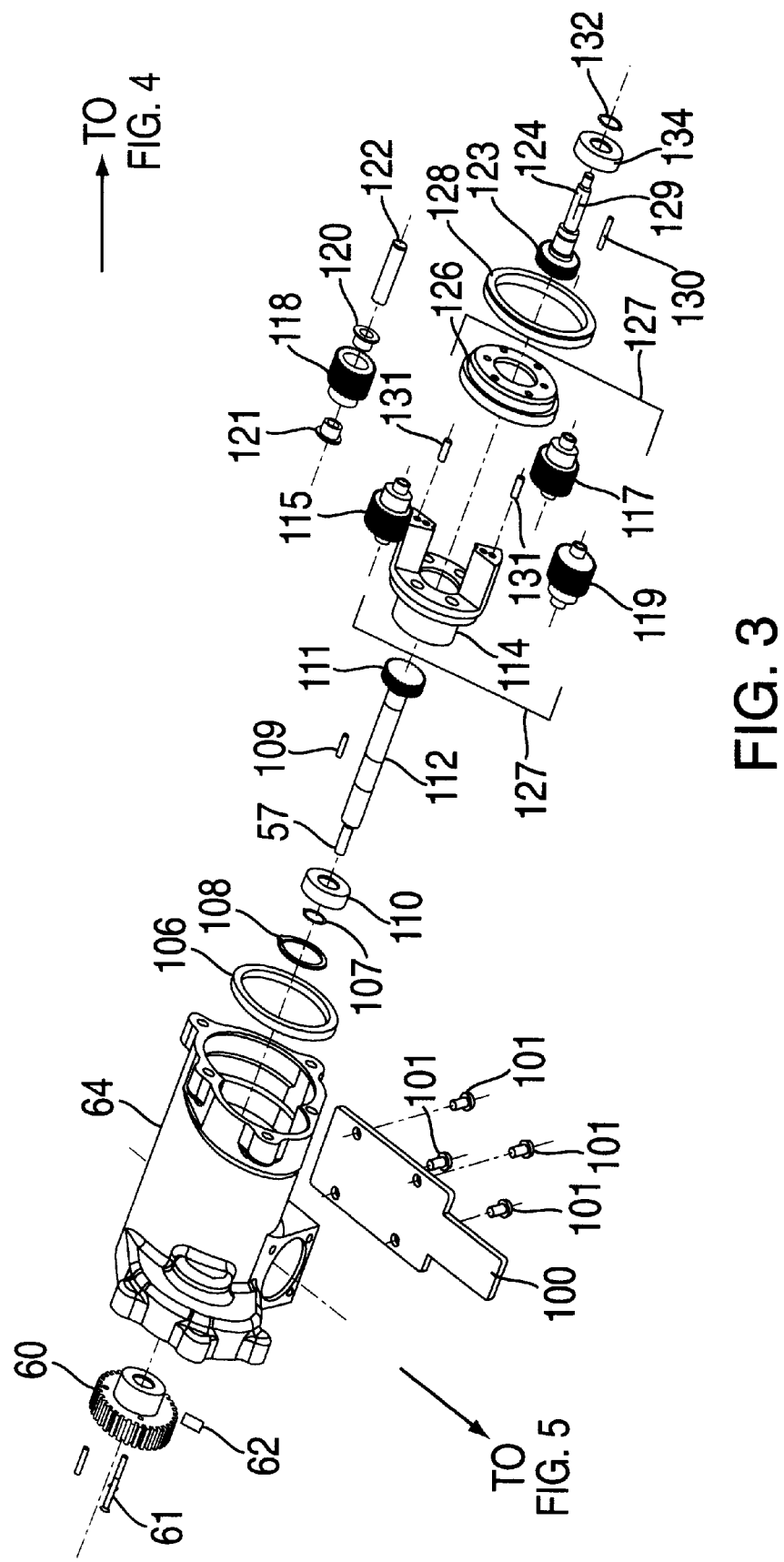

Referring to FIGS. 2 and 3, in an exemplary embodiment, a column head (shown on FIG. 1 as 21) is connected to a shaft 22, which is in operable communication with an input shaft 38, preferably by a coupling 24. An input gear 48 is in operable communication with input shaft 38 and supported by bearings 42, 50. Preferably, the operable communication is accomplished by a key 41 and key ways (not shown) disposed at input gear 48 and input shaft 38. The key/key way system prevents relative rotation between input gear 48 and input shaft 38. A retaining ring 52 secures both bearing 50 and input gear 48.

Input gear 48 is meshed with a differential input gear 54. Differential input gear 54 is in operable communication with a differential input shaft 112. Preferably, the operable communication is accomplished by a key 109 and key ways (one not shown), 55 disposed at differential input shaft 112 and differential input gear 54. The key/key way system prevents relative rotation between differential input gear 54 and differential input shaft 112. Differential input gear 54 is also axially supported along differential input shaft 112 by a retaining ring 56. Differential input shaft 112 is supported by bearings 44, 110.

Adjacent to differential input gear 54, a sensor 59 is plugged into a first end 57 of input shaft 112. Sensor 59 monitors the position of linear differential gear system 11. On the other side of differential input gear 54 is a worm gear 60, which is disposed at differential input shaft 112. Differential input shaft 112 passes through worm gear 60 and turns independently of worm gear 60. Worm gear 60 is rigidly connected to a differential carrier 127 so that differential carrier 127 rotates when worm gear 60 rotates. Differential carrier 127 comprises an input carrier plate 114 and an output carrier plate 126, which may be properly aligned by alignment pins 131. A pin 62 is disposed at worm gear 60 to stop worm gear 60 from rotating once worm gear 60 has turned a set distance. Pin 62 is more fully described in the operation section of this detailed description.

Figure 5:
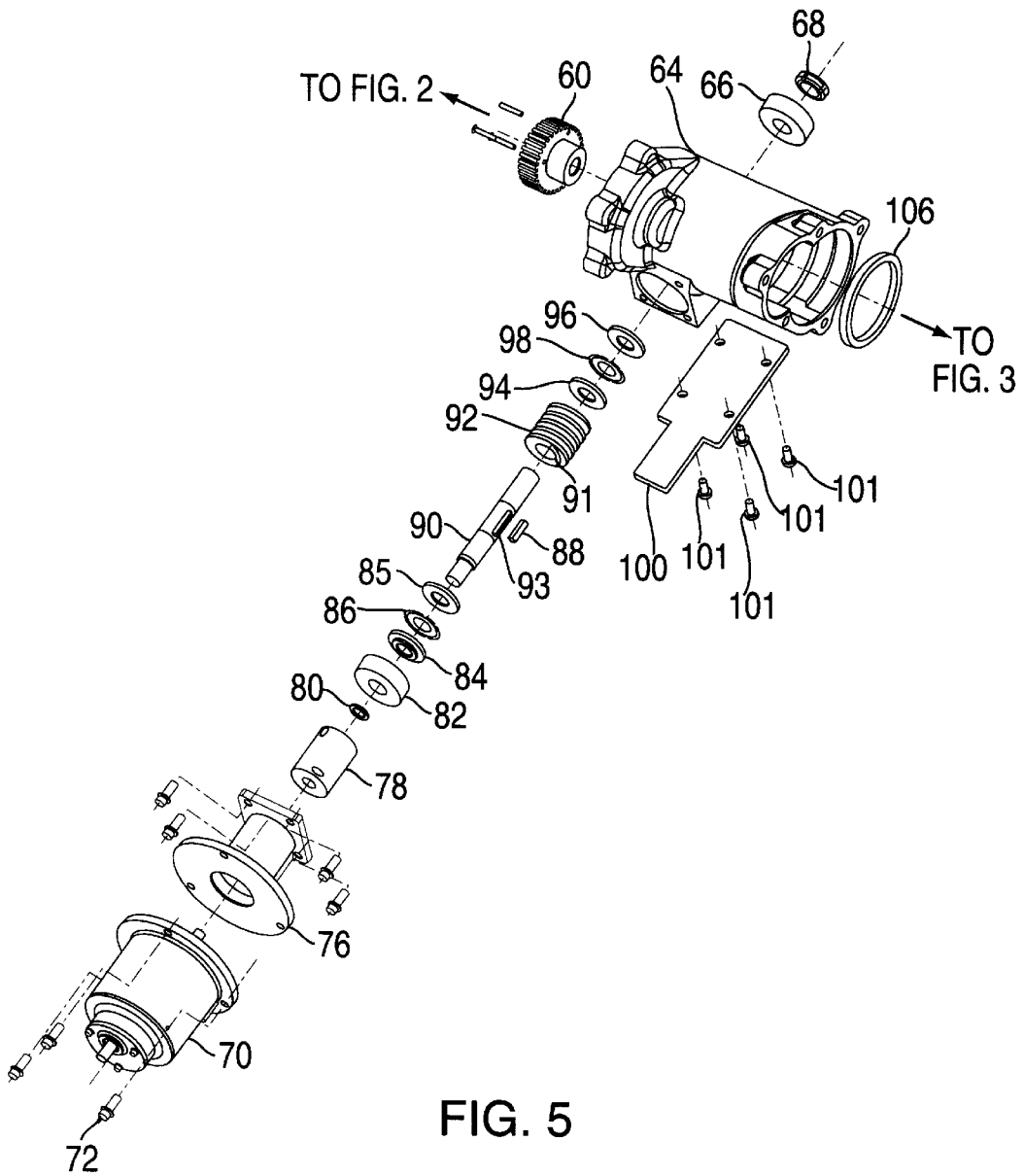

Referring to FIGS. 3 and 5, a worm 92 is in operable communication with a worm shaft 90. Preferably, the operable communication is accomplished by a key 88 and key ways 91, 93 disposed at worm 92 and worm shaft 90. The key/key way system prevents relative rotation between worm 92 and worm shaft 90. Worm 92 meshes with worm gear 60. Worm shaft 90 is supported by two bearings 66, 82. Bearing 66 is pressed against worm bearing thrust washer 96 and is axially supported to worm shaft 90 by a nut 68. Bearing 82 is pressed against worm bearing thrust washer 84 and is axially supported by a retaining ring 80. Belleville spring washers 86, 98 are disposed between worm bearing thrust washers 84, 96 and worm thrust washers 85, 94. Belleville spring washers 86, 98 prevent worm 92 from locking when worm gear 60 is prevented from rotating by pin 62. A motor 70 is in operable communication with worm shaft 90 so that motor 70 drives worm shaft 90. Preferably, the communication between motor 70 and worm shaft 90 is by a coupling 78. Motor 70 is mounted to a housing 64 by an adapter 76, which is secured by fasteners 72.

Referring to FIG. 3, adjacent to worm gear 60 is bearing 110, which is axially supported by a retaining ring 108. A retaining ring 107 supports bearing 110 and differential input shaft 112. Fixed at the end of differential input shaft 112 is an input sun gear 111. Differential input gear 54, input sun gear 111, and differential input shaft 112 rotate at the same speed.

Input sun gear 111 meshes with preferably two input differential planet gears 115, 117. Input differential planet gears 115, 117 mesh with two output differential planet gears 118, 119. Input differential planet gears 115, 117 and output differential planet gears 118, 119 are connected to both input carrier plate 114 and output carrier plate 126 in a manner that allows relation. Preferably, that connection is accomplished by the mounting each of input differential planet gears 115, 117 and output differential planet gears 118, 119 on a corresponding pin 122. Also mounted on each pin 122 are bushings 120, 121. Bushing 121 is pressed against input carrier plate 114. Bushing 120 is pressed against output carrier plate 126.

Figure 4:
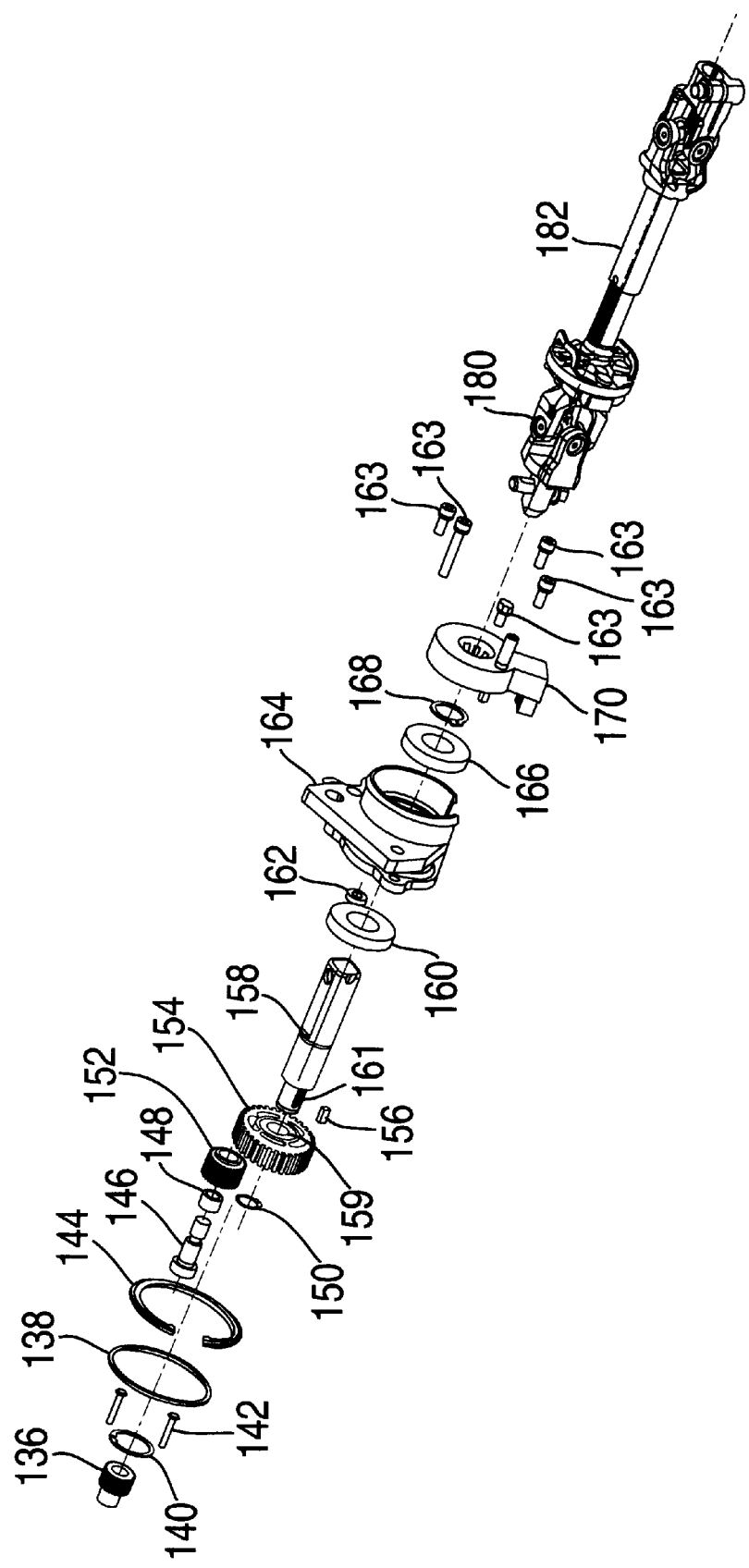

Referring to FIGS. 3 and 4, output differential planet gears 118, 119 mesh with an output sun gear 123, which is fixed at the end of a differential output shaft 124. Differential output shaft 124 is supported by a bearing 134. Bearing 162 is assembled into output cover 164 and supports shaft 146. Bearing 134 is supported at differential output shaft 124 by retaining rings 132, 140. Input carrier plate 114 and output carrier plate 126 are mounted together by a fastener 142 and are supported by bearings 106, 128. Retaining rings 138, 144 also support differential carrier 127.

A differential output gear 136 is disposed outside of differential carrier 127 and is in operable communication with differential output shaft 124. Preferably, the operable communication is accomplished by a key 130 and key ways 129, (one not shown) disposed at differential output shaft 124 and differential output gear 136. The key/key way system prevents relative rotation between differential output gear 136 and differential output shaft 124. Differential output gear 136, output sun gear 123, and differential output shaft 124 rotate at the same speed.

Differential output gear 136 meshes with an idler gear 152. Idler gear 152 is disposed at an idler shoulder bolt 146, secured by a retaining ring 150 and supported by a bearing 148. Shoulder bolt 146 is threaded into output cover 164. Idler gear 152 meshes with an output gear 154. Output gear 154 is in operable communication with an output shaft 158. Preferably, the operable communication is accomplished by a key 156 and key ways 161, 159 disposed at output shaft 158 and output gear 154. The key/key way system prevents relative rotation between output gear 154 and output shaft 158. A retaining ring 150 supports output gear 154 at output shaft 158. A bearing 160 supports output shaft 158 and is assembled into output cover 164.

Referring to FIGS. 1 through 4, steering column 15 is contained in a housing 64, which preferably includes an input cover 45, an output cover 164, and a worm cover 100. Worm cover 100 is secured to housing 64 by fasteners 101. Input cover 45 is secured to housing 64 by fasteners 31. Output cover 164 is secured to housing 64 by fasteners 163. Input shaft 38 and output shaft 158 extend from housing 64. A bearing 166 supports output shaft 158 at output cover 164 and is secured by a retaining ring 168. Housing 64 is mounted to a bracket/jacket assembly 30 and secured by fasteners 25. Bracket/jacket assembly 30 mounts to column head (not shown).

A position sensor 36 is mounted on input shaft 38 at the outside of housing 64 and adjacent to input housing cover 45. Another position sensor 170 is mounted at output shaft 158, outside of housing 64, and adjacent to output cover 164.

Output shaft 158 is in operable communication with an intermediate shaft 182 by a universal joint 180.

Operation

Referring to FIG. 1, steering column 15 comprises a linear differential gear system 11, which operates with or without motor 70 being powered. When motor 70 is not powered, steering system 20 operates in the following manner. The driver turns hand wheel 16, which is in operable communication with shaft 22 and input shaft 38. While the driver may turn hand wheel 16 either clockwise or counterclockwise, for purposes of illustration, assume that the driver has turned hand wheel 16 clockwise. The rotational force of hand wheel 16 is transmitted to input shaft 38, which rotates input gear 48 clockwise. Input gear 48, which is meshed with differential input gear 54, rotates differential input gear 54 counterclockwise. Moreover, the torque ratio steps up 1:3 from input gear 48 to differential input gear 54.

Differential input gear 54 rotates differential input shaft 112, which in turn rotates input sun gear 111 counterclockwise. Worm gear 60 is disposed at differential input shaft 112 between differential input gear 54 and input sun gear 111; however, differential input shaft 112 rotates independently from worm gear 60. Worm gear 60 is not directly rotated by hand wheel 16. Input sun gear 111, which meshes with two input differential planet gears 115, 117, rotates input differential planet gears 115, 117 clockwise. Two input differential planet gears 115, 117 mesh with two output differential planet gears 118, 119 and rotate output differential planet gears 118, 119 counterclockwise. Output differential planet gears 118, 119 mesh with output sun gear 123 and rotate output sun gear 123 clockwise. Output sun gear 123 rotates differential output shaft 124. All rotation from differential input gear 54 to output sun gear 123 occurs at a 1:1 ratio.

Disposed at differential output shaft 124 at the opposite end from output sun gear 123 is differential output gear 136. Differential output gear 136 rotates in the same direction as output sun gear 123. Differential output gear 136 meshes with idler gear 152, which rotates counterclockwise. Idler gear 152 meshes with output gear 154, which rotates clockwise. Idler gear 152 is utilized to change the rotational direction of output shaft 158 without redesigning the linear differential. The torque is stepped back down by a 3:1 ratio from differential output gear 136 to output gear 154. The 1:3 ratio is used to enable the employment of smaller diameter gears in the linear differential gear system. By doing so, the overall dimension of the linear differential gear system are minimized. Moreover, the 1:3 ratio allows employment of a motor having a lower torque output. When output gear 154 turns clockwise, it rotates intermediate shaft 182 clockwise, which ultimately steers road wheels 18 to the right (passenger side) of the vehicle.

Linear differential gear system 11 operates when motor 70 is powered. In that situation, the driver has either oversteered or understeered the vehicle and a controller (not shown) senses an inconsistency in the velocity, yaw, and direction of the vehicle. At the point that the driver has either oversteered or understeered the vehicle, controller (not shown) sends a signal to electric motor 70 to turn on.

Assuming for purposes of illustration that the driver turns hand wheel 16 too far clockwise and road wheels 18 assume a position that is not desirable, then the linear differential system 11 activates. While the driver holds hand wheel 16 in a manner that sufficiently restricts hand wheel 16 from moving counterclockwise, motor 70 activates and rotates worm 92, which in turn rotates worm gear 60. Worm gear 60, which is rigidly connected to a differential carrier (not shown), rotates differential carrier (not shown), which in turn rotates output differential planet gears 118, 119 clockwise.

Output differential planet gears 118, 119 mesh with output sun gear 123 rotating output sun gear 123 counterclockwise. Output sun gear 123, rotates differential output shaft 124. When differential output shaft 124 rotates, it turns differential output gear 136, which rotates in the same direction as output sun gear 123. The differential output gear 136 meshes with idler gear 152, which rotates clockwise. Idler gear 152 meshes with output gear 154, which rotates counterclockwise. Output gear 154 turns counterclockwise, it rotates intermediate shaft 182 counterclockwise, which ultimately steers road wheels 18 to the left (driver's side) of the vehicle.

In addition, if the driver continues to turn hand wheel 16 clockwise, linear differential gear system 11 operates to slow down the steering output. Thus, the rotation of road wheels 18 can vary as to the input of the rotation of hand wheel 16 from ratios ranging from 1:1 up to 1:20. Motor 70 only operates long enough to adjust road wheels 18 enough to reposition road wheels 18 to a more desirable setting. In one embodiment, road wheels 18 can only adjust a maximum of plus or minus five degrees as compared to the angle commanded by the driver. In such embodiment, a pin 62 is located at worm gear 60 to stop worm gear 60 from rotating once it has steered road wheels 18 plus or minus five degrees. It will be appreciated that in an alternate embodiment, if worm gear 60 did not have pin 62 so located, then worm gear 60 could continue to turn, which would continue to turn road wheels 18 in a direction consistent with worm rotation direction.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A steering system for a motor vehicle comprising:

a steering shaft;

a hand wheel attached to one end of said steering shaft;

an input shaft in mechanical communication with said steering shaft, said input shaft having an axis about which it rotates, said axis being displaced from an axis of said steering shaft;

an input sun gear fixed to said input shaft;

a planetary gear engaged to said input gear, said planetary gear being carried by a planetary gear carrier;

a second planetary gear engaged to said planetary gear, said second planetary gear not being engaged to said input sun gear;

an output sun gear engaged to said second planetary gear;

said output sun gear being in mechanical communication with an output shaft; and an electric motor in mechanical communication with said planetary gear carrier.

2. The steering system of claim 1 further comprising an input gear attached to another end of said steering shaft and a differential input gear engaged to said input gear, said differential input gear being fixed to said input shaft.

3. The steering system of claim 1 wherein said planetary gear carrier includes a worm gear and said electric motor is in mechanical communication with a worm, said worm being in engagement with said worm gear thereby placing said electric motor in mechanical communication with said planetary gear carrier.

4. The steering system of claim 1 further comprising a differential output gear in mechanical communication with a lower shaft of said steering system, said lower shaft having a pinion at its lower end in engagement with a rack portion of a rack and pinion steering mechanism.

5. The steering system of claim 4, wherein said differential output gear rotates in the same direction as said output sun gear.

6. The steering system of claim 4 wherein said lower shaft is in mechanical communication with an upper gear, said steering system further comprising an idler gear engaged with said differential output gear and said upper gear.

7. The steering system of claim 1 further comprising a stop formed on said worm gear to limit the extent of rotation of said worm gear.

8. The steering system of claim 7 wherein said stop comprises a pin.

* * * * *